March 9, 1954   P. L. SCHNEIDER   2,671,425
INDEX DIAL ILLUMINATOR
Filed Nov. 28, 1950
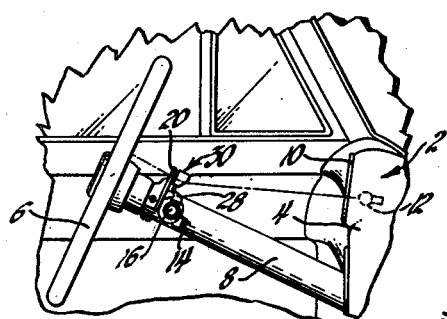
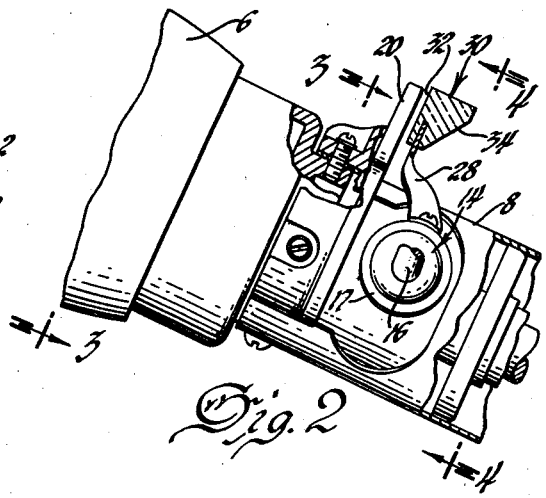
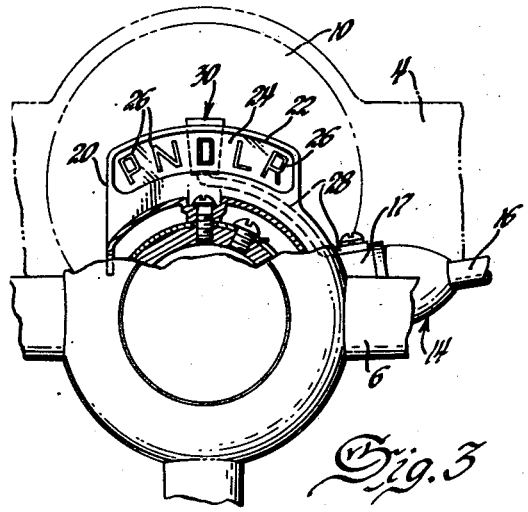
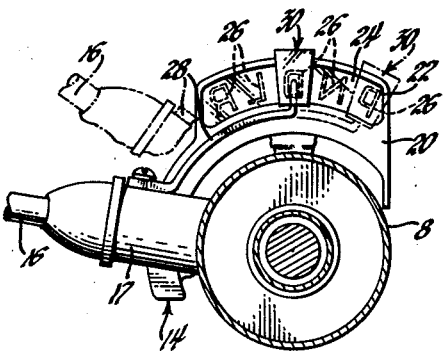
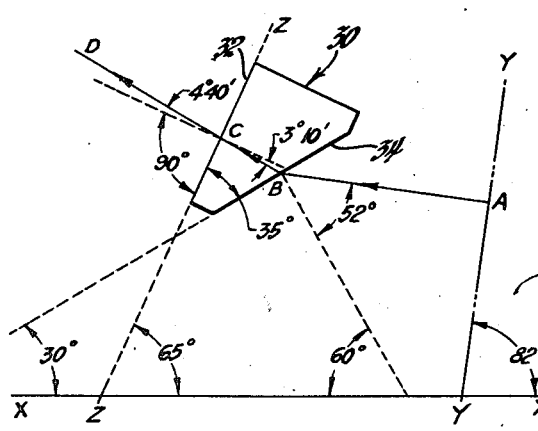
Inventor
Paul L. Schneider
By Willits, Helwig & Baillio
Attorneys Patented Mar. 9, 1954

2,671,425

UNITED STATES PATENT OFFICE 2,671,425

INDEX DIAL ILLUMINATOR

Paul L. Schneider, Anderson, Ind., assignor to General Motors Corporation, Detroit, Mich., a corporation of Delaware Application November 28, 1950, Serial No. 197,993

10 Claims. (Cl. 116—124)

The present invention relates to automotive vehicle transmission control devices and more particularly to indicia dials for such devices.

Heretofore automotive vehicle operators have become accustomed to the particular positioning motions required in shifting the transmission lever control mechanism to manually adjust the conventional transmission to the plurality of gear ratios required to accelerate a vehicle from a standing position to a running position. With the introduction and increasing current use of the vehicle transmission commonly referred to as the automatic transmission, a transmission lever control mechanism with substantially different positioning motions is used. To vehicle operators accustomed to the motions of the prior transmission control, the automatic transmission lever control is substantially different in operation and it is desirable to provide visual aid especially for operating the vehicle under conditions of darkness. Such transmission control mechanisms have heretofore been provided with visual aids in the form of indexing indicia on dials. However, in operating the vehicle during hours of darkness the lack of adequate illumination has caused the operator some inconvenience in positioning the control mechanism for proper operation of the vehicle.

Accordingly it is an object of the present invention to provide an improved indicia dial assembly for automotive vehicle transmission systems.

This and other objects are attained in accordance with the present invention by providing a novel indicia dial assembly with an indexing member adapted to transfer light from sources distributed along the dash panel to the indicia dial forming an illuminated background pattern which silhouette the indicia on the dial.

For a better understanding of the invention reference may be had to the drawing in which Figure 1 is a fragmentary view of an automotive vehicle illustrating a transmission control mechanism embodying the present invention; Figure 2 is an enlarged view of the transmission control mechanism partly in section and partly broken away; Figure 3 is a view taken on the line 3—3 of Figure 2; Figure 4 is a view taken on the line 4—4 of Figure 2 and Figure 5 is an optics diagram.

Referring now to the drawing and particularly to Figure 1 there is illustrated a fragmentary portion of the cab structure of an automotive vehicle 2 including an instrument panel 4 and a steering wheel 6 mounted for rotation on a steering column 8. An instrument cluster 10 mounted on the instrument panel 4 supports a plurality of instruments (not shown). Indirect illumination for the instruments is provided by a source of light 12 illustrated by dotted lines in Figure 1 as being mounted on the instrument panel behind the instrument cluster. Mounted on the steering column 8 below the steering wheel 6 is a transmission shifting lever mechanism 14 of a type substantially conventional to vehicles provided with speed changers or transmissions now commonly referred to as automatic transmissions.

As illustrated in Figures 2, 3 and 4 the shifting lever mechanism 14 comprises a manually operable lever 16 mounted for universal movement in a sleeve 17 integral with and extending from a shell rotatably mounted within the steering column. Attached to the steering column is a bracket 20 having an oblong arcuate window opening 22. Positioned in the window opening 22 is a transparent window or indicia dial 24 of similar oblong arcuate form. The transparent window 24 may be any suitable material such as the thermoplastic methyl-methacrylate resin commonly known as "Lucite." A plurality of indicia 26 are formed on the underside of the window 24 as positioning stations for the shifting mechanism. Attached to the sleeve 17 there is an indexing pointer bracket 28 which carries a transparent body 30. While the transparent body 30 may be made from substantially any transparent material, I have found that a thermoplastic of the acrylic polymer resin type known commonly as "Plexiglas" to be entirely satisfactory. To provide background illumination of suitable intensity for the indicia dial the plastic body 30 is provided with luminescent properties. This is accomplished in forming the body by adding a fluorescent material which is activated by exposure to the light of an incandescent lamp such as lamp 12 mounted behind the dash panel. Such materials are well-known and include inorganic oxides, organic dyes, etc. which may be conveniently included in the plastic body during the molding of the body. The body is generally prismatic in form as illustrated in Figure 2 and may be secured to the pointer bracket as by molding or any other suitable means. As illustrated in Figures 3 and 4 the body has sufficient cross-sectional area to provide a background area for each of the station indicia on the window 24.

In Figure 5 there is illustrated the relationship of the body 30 with the transparent indicia dial and the instrument cluster on the instrument panel. To provide an illuminated background for the indicia on the indicia dial the front face 32 is in a plane substantially parallel with the plane of the indicia dial and substantially adjacent thereto; the relationship between the indicia dial and the front face of the body 30 being illustrated in Figure 2. In Figure 5 the plane of the front face corresponds to the broken line z—z which is angularly disposed 65 degrees from the horizontal axis of the vehicle represented by the line x—x. The plane of the back face 34 of the body 30 corresponds to a line shown as being angularly disposed 30 degrees from the line x—x and 35 degrees from the line z—z; thus the front and back faces of the body 30 are angularly disposed 35 degrees. The plane of the instrument cluster 10 corresponds to the broken line y—y which is angularly disposed 82 degrees from the line x—x.

With such an arrangement of the body 30, a ray of light from the instrument cluster and indirectly from the light source 12 incident on the back face 34 along a path substantially that of line A—B angularly disposed 52 degrees to the normal line of surface 34 which in turn is angularly disposed 60 degrees from the line x—x, passes through the body 30 along the path of the line B—C and leaves the body along the path C—D to illuminate the indicia dial. Line B—C, the path of the ray of light in the body is illustrated as being angularly disposed 3 degrees and 10 minutes from a line normal to the surface 32 whereas the path of the ray of light upon leaving the body and corresponding to the line C—D is illustrated as being angularly disposed 4 degrees and 40 minutes from the line normal to surface 32. In this connection, I have found that rays of light following substantially the path above described provide optimum illumination of the indicia dial.

In operation under conditions of darkness light from indirect sources behind the instrument dial such as the light source 12 is incident on the back surface of body 30 and is refracted at this surface and passes either directly or by reflection internally from the side surfaces of the body through the body to provide an area of illumination or an illuminated background for the indicia at each of the indexing stations of the shifting lever. With light from the indirect sources incident upon the body and passing therethrough the fluorescent constituent therein is activated to cause increased illumination. This affords the operator an illuminated view of the station indicia with the indicia in silhouette thus making it more convenient for the operator to set the shifting lever to its proper station.

While the embodiment of the present invention as herein disclosed, constitutes a preferred form, it is to be understood that other forms might be adopted all coming within the scope of the claims which follow.

What I claim as new and desire to secure by Letters Patent of the United States is:

1. A transmission shifting mechanism indexing device for automotive vehicles comprising a support, a transparent dial attached to said support, said dial having a plurality of spaced indicia thereon, a shifting lever mounted on said support, a transparent body attached to said shifting lever and movable therewith in a path substantially adjacent said dial, said body being adapted to transmit light to said dial to provide an illuminated background for said indicia.

2. A transmission shifting mechanism indexing device for automotive vehicles comprising a support, a transparent dial attached to said support, said dial having a plurality of spaced indicia thereon, a shifting lever rotatably mounted on said support, a radio lucent body attached to said shifting lever and movable therewith in a path substantially adjacent said dial, said body being adapted to transmit light to said dial to provide an illuminated background for said indicia.

3. A transmission shifting mechanism indexing device for automotive vehicles comprising a support, a transparent dial attached to said support, said dial having a plurality of spaced indicia thereon, a shifting lever mounted on said support, a generally prismatic body of transparent material attached to said lever and movable therewith in a path substantially adjacent said dial, said body being adapted to transmit light to said dial to provide an illuminated background for said indicia.

4. A transmission shifting mechanism indexing device for automotive vehicles comprising a support, a shifting lever mounted on said support, a transparent dial mounted on said support adjacent said shifting lever, said dial having a plurality of indicia thereon to index the respective operating stations for said shifting lever, a generally prismatic transparent body attached to said shifting lever and movable therewith in a path adjacent said dial for transmitting light to said dial, said body having a front face in a plane substantially parallel to the plane of said dial and a back face in a plane angularly disposed to the plane of said dial.

5. A transmission shifting mechanism indexing device for automotive vehicles comprising a support, a lever mounted for shifting movement on said support, a transparent dial mounted on said support adjacent said shifting lever, said dial having a plurality of station indicating indicia thereon to index the respective operating stations of said shifting lever, a generally prismatic transparent body of methyl-methacrylate resin attached to said lever and movable therewith in a path adjacent said dial for transmitting light to the said dial, said body having a front face in a plane substantially parallel to the plane of said dial and a light incident face in a plane angularly disposed to the plane of said dial.

6. In combination in an automotive vehicle, a steering column, a transmission shifting lever mechanism mounted on said column including a lever shiftable about the axis of said column to a plurality of vehicle operation stations, a transparent dial mounted on said column adjacent said shifting lever mechanism, said dial having a plurality of spaced indicia thereon, a light source, a generally prismatic transparent body mounted on said lever and shiftable therewith along a path adjacent said dial to positions in alignment with each of said indicia, said body being adapted to transmit light from said light source to said dial to provide an illuminated background for said indicia.

7. A transmission shifting mechanism device for automotive vehicles comprising a support, a transparent dial attached to said support, said dial having a plurality of spaced indicia thereon, a shifting lever mounted on said support, a transparent luminescent body attached to said shifting lever and movable therewith in a path substantially adjacent said dial, said body being adapted to luminesce where activated by light to provide an illuminated background for said indicia.

8. A transmission shifting mechanism device for automotive vehicles comprising a support, a transparent dial attached to said support, said dial having a plurality of spaced indicia thereon, a shifting lever mounted on said support, a transparent fluorescent body attached to said shifting lever and movable therewith in a path substantially adjacent said dial, said body being adapted to fluoresce when activated by artificial light to provide an illuminated shiftable background for said indicia.

9. A transmission shifting mechanism indexing device for automotive vehicles comprising a support, a transparent dial attached to said support, said dial having a plurality of spaced indicia thereon, a shifting lever mounted on said support, a generally prismatic fluorescent body of transparent material attached to said lever and movable therewith in a path substantially adjacent said dial, said body being adapted to transmit light to said dial to provide an illuminated background for said indicia.

10. In combination in an automotive vehicle, a steering column, a transmission shifting lever mechanism mounted on said column including a lever shiftable about the axis of said column to a plurality of vehicle operation stations, a transparent dial mounted on said column adjacent said shifting lever mechanism, said dial having a plurality of spaced indicia thereon, a light source, a generally prismatic luminescent body of transparent material mounted on said lever and shiftable therewith along a path adjacent said dial to positions in alignment with each of said indicia, said body being adapted to transmit light from said light source to said dial to provide an illuminated background for said indicia.

PAUL L. SCHNEIDER.

References Cited in the file of this patent

UNITED STATES PATENTS

| Number | Name | Date |
| --- | --- | --- |
| 1,978,651 | Shapiro | Oct. 30, 1934 |
| 1,999,429 | Tibbets | Apr. 30, 1935 |
| 2,081,827 | Lohe | May 25, 1937 |
| 2,287,554 | Hansen | June 23, 1942 |
| 2,328,485 | Ott | Aug. 31, 1943 |
| 2,347,702 | Maris | May 2, 1944 |
| 2,382,806 | Motson | Aug. 14, 1945 |

FOREIGN PATENTS

| Number | Country | Date |
| --- | --- | --- |
| 419,305 | Great Britain | Nov. 9, 1934 |